US007912517B2

(12) United States Patent
Park

(10) Patent No.: US 7,912,517 B2
(45) Date of Patent: *Mar. 22, 2011

(54) POWER SAVING METHOD FOR MOBILE COMMUNICATION TERMINAL

(75) Inventor: Won Hyung Park, Seoul (KR)

(73) Assignee: LG Electronics Inc., Seoul (KR)

( * ) Notice: Subject to any disclaimer, the term of this patent is extended or adjusted under 35 U.S.C. 154(b) by 579 days.

This patent is subject to a terminal disclaimer.

(21) Appl. No.: 11/648,671

(22) Filed: Jan. 3, 2007

(65) Prior Publication Data

US 2007/0111764 A1  May 17, 2007

Related U.S. Application Data

(63) Continuation of application No. 10/117,058, filed on Apr. 8, 2002, now Pat. No. 7,242,971.

(30) Foreign Application Priority Data

May 25, 2001 (KR) .................................. 29032/2001

(51) Int. Cl.
H04M 1/00 (2006.01)
(52) U.S. Cl. .................. 455/574; 455/127.5; 455/343.5; 455/393.1; 455/575.3
(58) Field of Classification Search ............. 379/433.06, 379/433.07, 368; 345/102, 211–214; 455/574, 455/127.5, 393.1, 575.3, 13.4, 423, 550.1, 455/572, 575.1, 90.3, 343.1–343.6, 556.1, 455/127.1, 211, 566, 414.1, 561, 524
See application file for complete search history.

(56) References Cited

U.S. PATENT DOCUMENTS

| 5,870,685 | A | 2/1999 | Flynn | |
|---|---|---|---|---|
| 6,138,032 | A | 10/2000 | Hill et al. | |
| 6,275,712 | B1 | 8/2001 | Gray et al. | |
| 6,278,887 | B1 | 8/2001 | Son et al. | |
| 6,294,895 | B1 | 9/2001 | Kukai | |
| 6,584,330 | B1 | 6/2003 | Ruuska | |
| 6,667,731 | B2 | 12/2003 | Park | |
| 6,725,064 | B1 | 4/2004 | Wakamatsu et al. | |
| 6,731,958 | B1 | 5/2004 | Shirai | |
| 7,095,400 | B2 * | 8/2006 | Ho et al. | 345/102 |
| 7,250,943 | B2 * | 7/2007 | Kamiyama | 345/204 |
| 7,301,522 | B2 * | 11/2007 | Ko | 345/102 |
| 7,440,751 | B2 * | 10/2008 | Boros | 455/418 |
| 2002/0142792 | A1 * | 10/2002 | Martinez | 455/550 |

* cited by examiner

*Primary Examiner* — Pablo N Tran
(74) *Attorney, Agent, or Firm* — KED & Associates LLP

(57) ABSTRACT

A power saving method for a mobile telephone is disclosed that can increase the useful life of a battery charge by temporarily turning off non-essential telephone functions not required for call transmission or reception. The method determines whether the remaining capacity of the telephone battery is smaller than a predetermined reference value. The power saving method includes the steps of setting an activation condition for non-essential telephone functions, detecting a state that satisfies the activation condition, measuring the remaining capacity of the telephone's battery if the activation condition is satisfied, and controlling an activation operation of the non-essential telephone functions by comparing the measured remaining charged capacity with a reference value. The power saving method may include saving to and recalling from memory user preference settings when a user function is de-activated and re-activated, respectively.

21 Claims, 3 Drawing Sheets

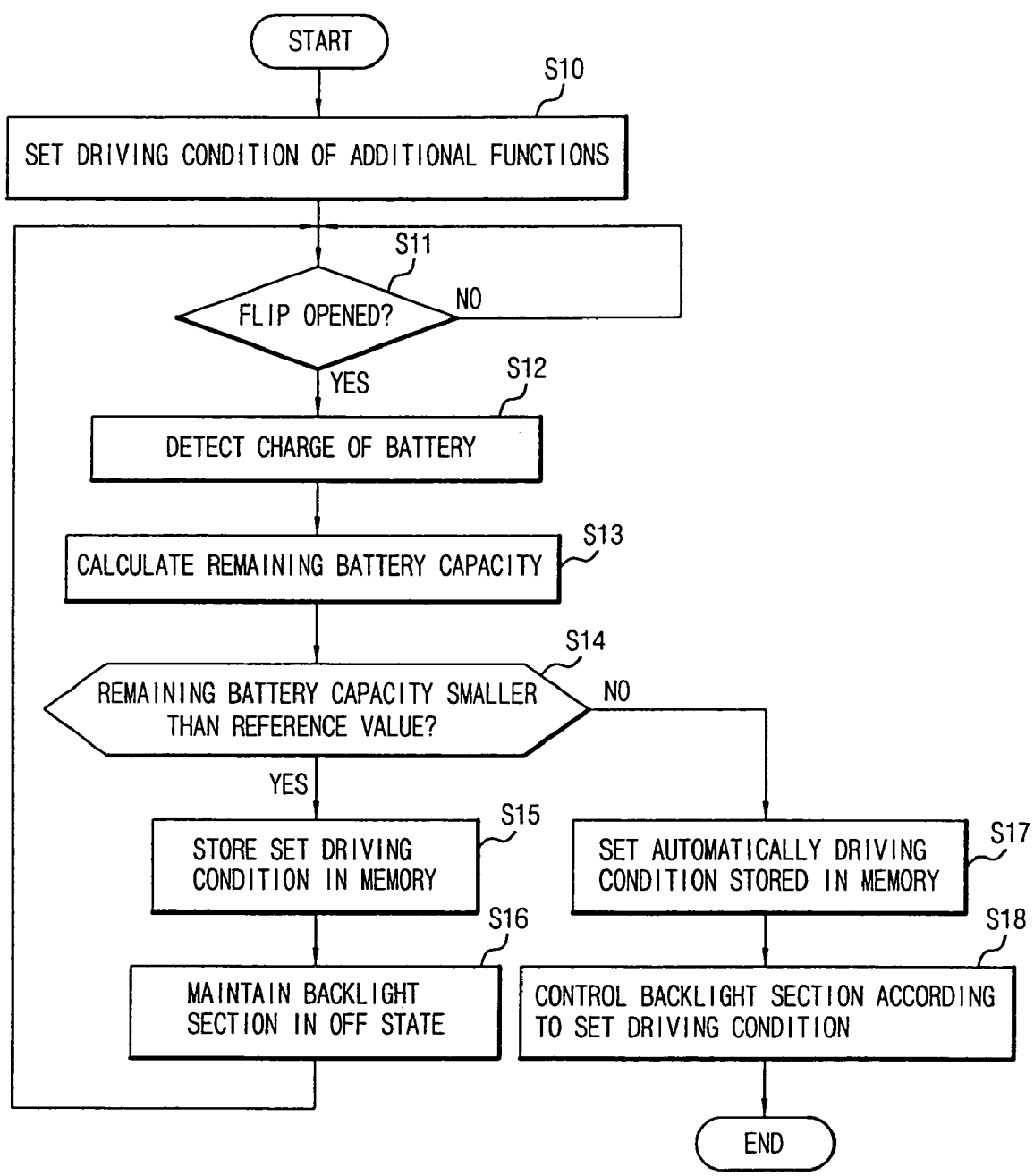

POWER SAVING METHOD FOR MOBILE COMMUNICATION TERMINAL

This application is a Continuation of U.S. application Ser. No. 10/117,058 filed Apr. 8, 2002 now U.S. Pat. No. 7,242,971. The disclosures of the previous application is incorporated by reference herein.

BACKGROUND OF THE INVENTION

1. Field of the Invention

The present invention relates generally to a telephone, and more particularly, to a mobile telephone.

2. Background of the Related Art

Referring to FIG. 1, a related art mobile terminal or subscriber unit includes a mobile station modem (MSM) 10, and user functions such as a vibration motor 11, back-light circuitry 12, audio alert circuitry 13, and LED display 14. The operations of the MSM 10 include controlling an audio alert 13 such as a buzzer or ringer, the vibration motor 11, and the back-light circuitry 12 and/or the LED display 14 user functions. The MSM 10 controls the user functions by detecting an input from a key button on the keypad, the opening of the telephone's flip, or reception of an incoming call.

A user can select desired user preferences for controlling the operation of the user functions through a menu. For example, the user can select the user preferences so that the back-light is turned on when the flip is opened or when the phone rings. The user can also set the user preferences so that when the phone rings, the MSM 10 drives the vibration motor 11 or audio alert 13 according to the user's menu settings, and then activates the back-light 12. When any user function is activated, power is supplied to the circuitry driving the user function from the battery.

Based on the type of mobile terminal, the user may set the user preferences to enhance the convenience of using the terminal by enabling or disabling certain user functions. For example, the user may alternatively set the user preferences to turn on the back-light by activating the back-light section 12 with the MSM. In the case of a bar type terminal, the back-light can be set to turn on when the phone rings or when the user presses a key button to key-in a telephone number. In case of a flip type or folder type terminal, the back-light can be set to activate when the phone rings or the user opens the flip or cover to place a call.

The related art mobile terminal has various problems. For example, user functions that are not essential to telephone call transmission or reception are performed whenever its user preference settings are satisfied. Thus, selected user functions will continue to be activated irrespective of the remaining capacity of the battery.

Specifically, in the case of the bar type mobile telephone, the back-light, vibration motor, and audio alert may be set to activate whenever a key button is pressed or the phone rings. These features draw substantial current from the battery. In the case of the flip type or folder type mobile telephone, the back-light may activate whenever the user opens the flip or cover and the telephone is in standby mode and presents similar power consumption problems.

Moreover, other additional functions such as the vibration motor, LED, etc., are always activated irrespective of the remaining capacity of the battery, whenever the condition for the user preference is satisfied. Thus, even when the battery power is low, the same amount of current is consumed as when the battery power is high. Accordingly, when the battery power is low, the continued operation of the user functions depletes the already small amount of power remaining in the battery, and unnecessarily limits the remaining time during which the mobile telephone can transmit or receive a telephone call.

SUMMARY OF THE INVENTION

An object of the invention is to substantially solve one or more the above problems and/or disadvantages in a whole or in part and to provide at least the advantages described hereinafter.

Another object of the present invention is to reduce the current consumption of a battery in a mobile communication terminal.

Another object of the present invention is to increase the time between recharges of a battery.

Another object of the present invention is to selectively control additional user functions not directly required to transmit or receive a telephone call in accordance with the power remaining in the terminal's battery.

In order to achieve at least the above objects in a whole or in parts, there is provided a method to save power for a telephone including the steps of setting user preferences to control user functions based on certain activation conditions, detecting a state that satisfies the activation condition, measuring a remaining capacity of a battery if the activation condition is satisfied, and controlling a driving operation of the additional functions by comparing the remaining capacity with a reference value.

To further achieve at least the above objects in whole or in parts, there is provided a method to save power for a mobile telephone that includes determining whether the measured remaining capacity of a mobile telephone's battery is smaller than a certain reference value, storing the setting of the activation condition of non-essential user functions in a memory if the measured remaining capacity is smaller than the reference remaining capacity; and de-activating user functions irrespective of the set activation condition.

To further achieve at least the above objects in whole or in parts, there is provided a mobile terminal, which includes a controller for controlling a plurality of user functions, a detector for detecting a remaining capacity of a battery, a deactivator for deactivating at least one of the user functions, and a reactivator for reactivating the user function if the remaining capacity is greater than a reference value.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 3 is a chart illustrating a power saving method for a mobile telephone according to the preferred embodiment of the invention.

DETAILED DESCRIPTION OF PREFERRED EMBODIMENTS

A preferred embodiment of the invention includes a power saving method for a mobile communication terminal which selectively disables non-essential telephone user functions when the remaining charge, on the terminal's battery falls below a certain value or a reserve power condition.

Figure 1:
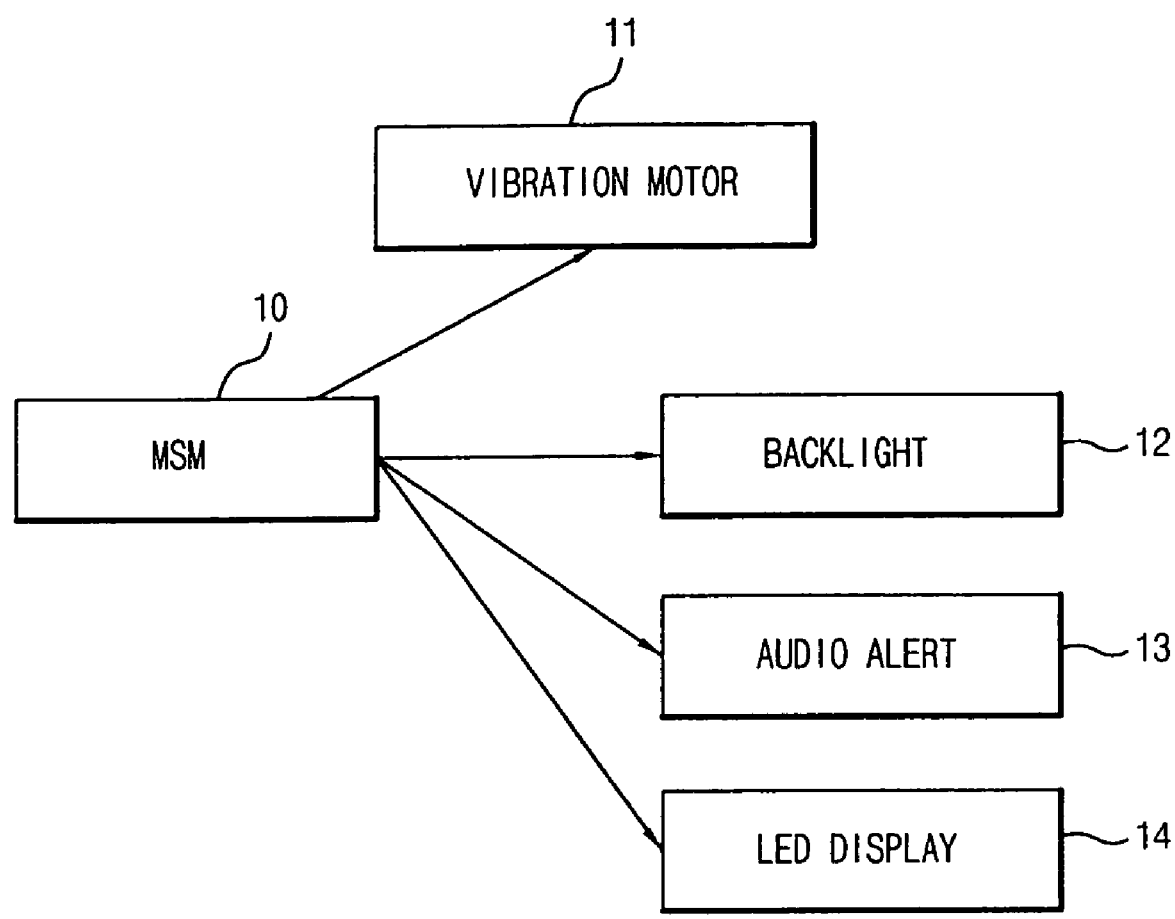
FIG. 1 is a block diagram illustrating the relationship of components of a related art mobile telephone.
Figure 2:
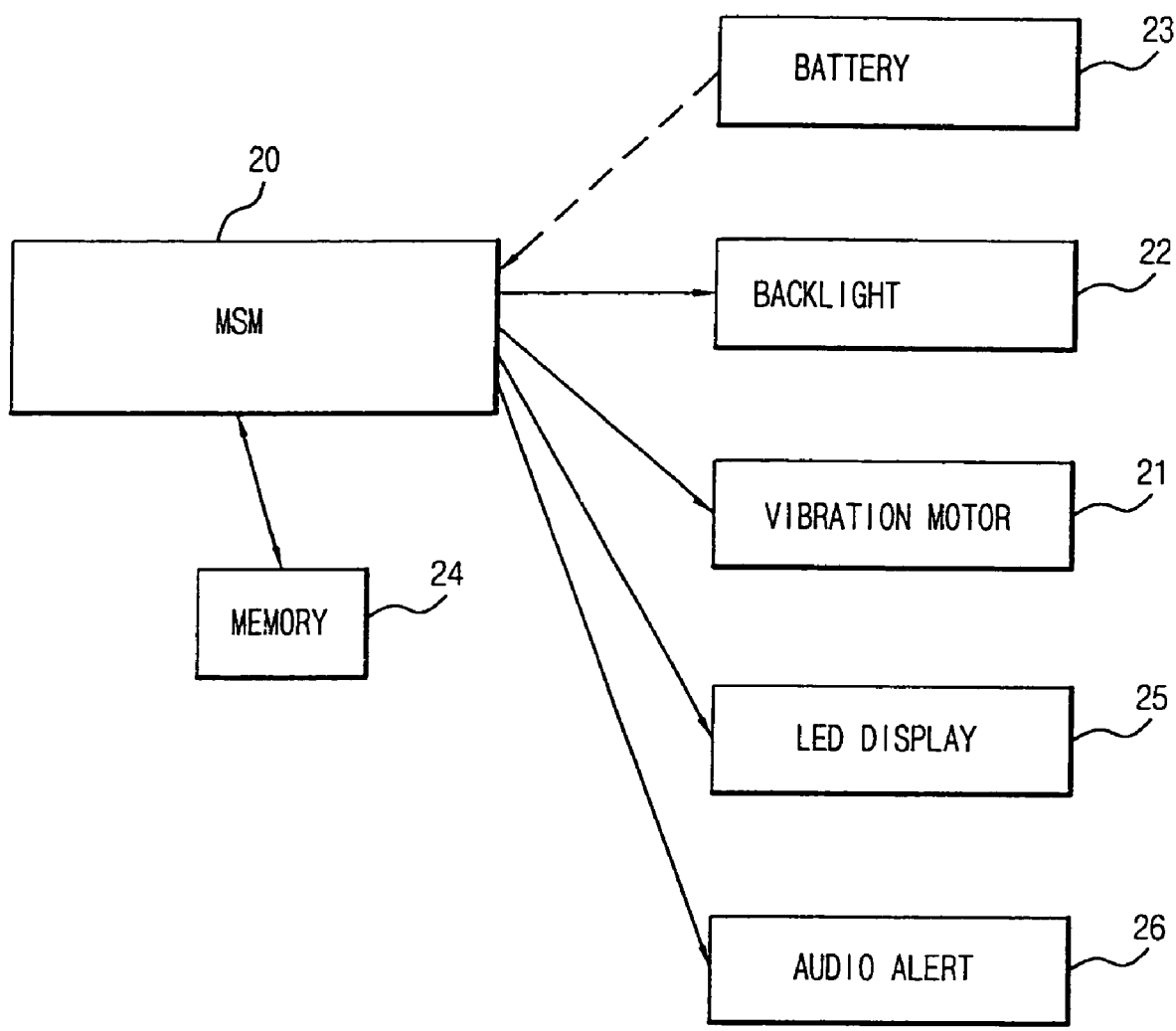
FIG. 2 is a block diagram illustrating the relationship between components of a mobile telephone according to the preferred embodiment of the invention.

FIG. 2 shows a preferred embodiment of mobile station according to the present invention. The terminal preferably includes a mobile station modem (MSM) 20, which performs control operations of the mobile telephone. If an activation condition of a user function set by a user is satisfied, the MSM 20 checks the remaining charge of a battery 23, and selectively activates the user function component. Such user functions may include a vibration motor 21, a back-light 22 for the terminal's information display panel, a LED display 25, or an audio alert 26. The MSM 20 is preferably coupled to a memory 24. The memory 24 is configured to store user preferences for the mobile terminal.

FIG. 3 illustrates a method of saving power in a mobile terminal according to the preferred embodiment. The example in FIG. 3 relates to activating the back-light 22 of FIG. 2. It should be understood that this method could be applied to any combination of user preferences.

Referring to FIGS. 2 and 3, the user first sets the user preference settings controlling the associated user functions or preferences using a menu (S10). In this example, the user sets the user preferences so that the back-light 22 for the telephone information display panel will automatically turn on when a flip is opened. The MSM 20 controls the operation of the user functions, and stores the back-light function user setting in the memory 24.

When the user preference is set so that the back-light 22 is automatically activated when the flip is opened, the MSM 20 detects when the flip is opened (S11). When the flip is opened, the MSM 20 determines the electric charge remaining in the battery (S12). This is preferably done in the form of a voltage or current measurement. The MSM 20 then calculates the remaining capacity of the battery (S13). After the remaining capacity of the battery 23 is measured, the MSM 20 checks whether the remaining capacity is smaller than a prescribed reference value (S14). The reference value is preferably set to be about 20% of the battery's total capacity. It should be understood that the reference value can be changed by the user as needed.

If the MSM 20 determines that the remaining capacity of the battery 23 is less than the prescribed value, the MSM20 stores the associated user preferences in the memory (S15). In this example, the current back-light setting is stored in memory 24. The MSM 20 further deactivates the back-light 22 setting irrespective of the user preference set by the user (S16). Accordingly, the back-light 22 is not activated if the user opens the flip. This condition is maintained while the battery charge is below the prescribed level.

Thereafter, when the battery 23 is charged, and the remaining capacity of the battery 23 becomes greater than the prescribed level, the MSM 20 recalls the user preferences stored in the memory 24, and automatically resets those parameters (S18). Thus, the activation parameter of the back-light is re-established. If the user then opens the flip, the MSM 20 activates the back-light 22 according to the user preference settings (S18).

The embodiment of the invention illustrated in FIG. 3 is an example where the back-light 22 user preference is set so that the back-light is activated whenever the flip is opened. However, the present invention is not limited to such an embodiment and can be also applied to any set of user preferences. For example, the user preference functions could be set so that the back-light 22 is turned on whenever a key button is pressed, or the phone rings, etc. Further, an embodiment of the invention can be applied to other user functions such as the vibration motor 21, in addition to the back-light 22. When applied to the vibration motor 21 the user preference may be set so that the force of the vibration motor 21 is reduced, or the vibration motor is completely de-activated.

In addition to the user functions illustrate herein, an embodiment of the invention can be applied to other additional user functions that are not essential to the audio and text data transmission and reception of a telephone call. Such additional user functions may include an LED display 25, or an audio alert 26. Other embodiments of the invention may include simultaneously de-activating multiple user functions.

As described above, the preferred embodiment of the invention has many advantages. For example, user set preference functions that are not directly required for the audio and text data transmission and/or reception can be temporarily de-activated in accordance with the remaining capacity in the telephone battery 23. Thus, the useful life between re-charges of the battery 23 can be extended.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for saving power in a mobile terminal, comprising:
    detecting occurrence of an activation condition, the activation condition corresponding to at least one non-essential telephone function;
    measuring a remaining power capacity of a battery in response to detection of the activation condition;
    determining whether the remaining power capacity of the battery is smaller than a prescribed reference value; and
    automatically de-activating the at least one non-essential telephone function when the remaining power capacity is smaller than the prescribed reference value, wherein deactivation of the at least one non-essential telephone function is not determined by a user and wherein when a power capacity of the battery is determined to be larger than the prescribed reference value, the mobile terminal is automatically configured to allow operation of the at least one non-essential telephone function.

2. The method of claim 1, further comprising:
    setting the activation condition for the at least one non-essential telephone function.

3. The method of claim 2, wherein the activation condition is set based on information received from a user.

4. The method of claim 3, wherein said information is received through a user menu provided by the mobile terminal.

5. The method of claim 2, wherein said deactivation includes not performing the at least one non-essential telephone function when the activation condition occurs.

6. The method of claim 1, further comprising:
    storing a setting identifying the at least one non-essential telephone function in a memory, the setting stored in response to said determination that the remaining power capacity of the battery is smaller than the prescribed reference value, and wherein the at least one non-essential telephone function is automatically de-activated after and only after the setting identifying the at least one non-essential telephone function is stored in said memory.

7. The method of claim 6, further comprising:
retrieving the setting identifying the at least one non-essential telephone function from said memory when the power capacity of the battery is determined to be larger than the prescribed reference value, and
automatically restoring the setting in the mobile terminal to allow operation of the at least one non-essential telephone function in response to the activation condition, the setting automatically restored in the mobile terminal in response to the setting being retrieved from said memory.

8. The method of claim 1, wherein the power capacity of the battery becomes larger than the prescribed reference after a battery charging operation is performed.

9. The method of claim 1, wherein the non-essential telephone function is one of a back-light, a vibration motor, an audio alert, or a display.

10. The method of claim 1, wherein the activation condition is receiving a phone call and the at least one non-essential telephone function corresponds to a reduction in a rate of vibration of a vibrator.

11. The method of claim 1, further comprising:
setting the activation condition corresponding to the at least one non-essential telephone function, wherein said measuring includes:
measuring the remaining power capacity of the battery without reserving activation of the at least one non-essential telephone function if the activation condition is satisfied, and wherein said de-activating includes:
de-activating the at least one non-essential telephone function irrespective of the activation condition setting when the remaining power capacity of the battery is smaller than the prescribed reference value.

12. The method of claim 11, further comprising:
automatically activating the at least one non-essential telephone function when the remaining power capacity of the battery is larger than the prescribed reference value.

13. A mobile terminal, comprising:
a battery;
a detector to detect occurrence of an activation condition, the activation condition corresponding to at least one non-essential telephone function; and
a controller to automatically de-activate the at least one non-essential telephone function when a remaining power capacity of the battery is smaller than a prescribed reference value, the remaining power capacity of the battery determined in response to detection of the activation condition, wherein deactivation of the at least one non-essential telephone function is not determined by a user and wherein the controller is automatically configured to allow operation of the at least one non-essential telephone function when a power capacity of the battery is determined to be larger than the prescribed reference value.

14. The mobile terminal of claim 13, wherein the controller sets the activation condition for the at least one non-essential telephone function.

15. The mobile terminal of claim 14, wherein the controller sets the activation condition based on information received from a user.

16. The mobile terminal of claim 15, wherein said information is received through a user menu provided by the mobile terminal.

17. The mobile terminal of claim 14, wherein said deactivation includes not performing the at least one non-essential telephone function when the activation condition occurs.

18. The mobile terminal of claim 13, further comprising:
a memory for storing a setting identifying the at least one non-essential telephone function in a memory, the setting stored in response to said detection that the remaining power capacity of the battery is smaller than the prescribed reference value, wherein the controller automatically de-activates the at least one non-essential telephone function after and only after the setting identifying the at least one non-essential telephone function is stored in said memory.

19. The mobile terminal of claim 18, wherein the controller retrieves the setting identifying the at least one non-essential telephone function from said memory when the power capacity of the battery is detected to be larger than the prescribed reference value, and wherein the controller automatically restores the setting in the mobile terminal to allow operation of the at least one non-essential telephone function in response to the activation condition, the setting automatically restored in response to the setting being retrieved from said memory.

20. The mobile terminal of claim 13, wherein the power capacity of the battery becomes larger than the prescribed reference after a battery charging operation is performed.

21. The mobile terminal of claim 13, wherein the non-essential telephone function is one of a back-light, a vibration motor, an audio alert, or a display.

* * * * *